(12) United States Patent
Talwin et al.

(10) Patent No.: US 11,751,550 B2
(45) Date of Patent: Sep. 12, 2023

(54) AXIAL PINION SEAL

(71) Applicant: Pure Fishing, Inc., Spirit Lake, IA (US)

(72) Inventors: Mark Talwin, Lexington, SC (US); Cameron Ivie, Irmo, SC (US)

(73) Assignee: Pure Fishing, Inc., Spirit Lake, IA (US)

( * ) Notice: Subject to any disclaimer, the term of this patent is extended or adjusted under 35 U.S.C. 154(b) by 0 days.

(21) Appl. No.: 17/457,241

(22) Filed: Dec. 1, 2021

(65) Prior Publication Data
US 2022/0174925 A1 Jun. 9, 2022

Related U.S. Application Data

(60) Provisional application No. 63/120,821, filed on Dec. 3, 2020.

(51) Int. Cl.
*A01K 89/01* (2006.01)
*A01K 89/015* (2006.01)

(52) U.S. Cl.
CPC ...... *A01K 89/0193* (2015.05); *A01K 89/0117* (2013.01); *A01K 89/011223* (2015.05)

(58) Field of Classification Search
CPC ...... A01K 89/011221; A01K 89/01928; A01K 89/0193
See application file for complete search history.

(56) References Cited

U.S. PATENT DOCUMENTS

| | | |
|---|---|---|
| 2013/0206889 A1 | 8/2013 | Ochia |
| 2015/0157000 A1 | 6/2015 | Hiraoka et al. |
| 2018/0055025 A1 | 3/2018 | Da Rosa |
| 2020/0196585 A1* | 6/2020 | Ochiai ................. A01K 89/006 |

FOREIGN PATENT DOCUMENTS

| | | | | |
|---|---|---|---|---|
| CN | 2384043 Y | | 6/2000 | |
| CN | 101904324 A | * | 12/2010 | ............ A01K 89/01 |
| CN | 104686464 A | * | 6/2015 | ............ A01K 89/01 |
| JP | 2002354974 A | | 12/2002 | |
| KR | 20180003444 A | * | 1/2018 | ....... A01K 89/01555 |

* cited by examiner

*Primary Examiner* — Emmanuel M Marcelo
(74) *Attorney, Agent, or Firm* — Husch Blackwell LLP

(57) ABSTRACT

A fishing reel includes a lipped seal in the axial direction of the pinion of the fishing reel. An axial seal, rather than radial seal, provides a contact seal that relies less on manufacturing consistencies of the parts within the fishing reel.

20 Claims, 4 Drawing Sheets

AXIAL PINION SEAL

CROSS-REFERENCE TO RELATED APPLICATIONS

This application claims priority to U.S. Provisional Patent Application Ser. No. 63/120,821, filed on Dec. 3, 2020, entitled "AXIAL PINION SEAL," the entire disclosure of which is incorporated herein by reference.

FIELD OF THE INVENTION

The present invention relates generally to an axial seal aimed to reduce the friction on a pinion gear of a spinning fishing reel.

BACKGROUND OF THE INVENTION

Most seals relating to pinions in fishing rod reels engage in the radial direction which makes it difficult to control the amount of seal engagement. Engaging in the radial direction relies on tight tolerances between multiple parts and does not allow easy adjustment of the seal pressure, which creates a larger variation in seal pressure.

SUMMARY OF THE INVENTION

A lipped seal is provided that engages in the axial direction of the pinion. By engaging in the axial direction rather than the radial direction, the engagement of the pinion seal is more easily controllable. One can simply adjust the relative axial positions of the seal and contact surface. The consistency of the pressure and therefore drag of the present invention has less variation due to roundness and concentricity effects in the parts and their relative positions.

BRIEF DESCRIPTION OF THE DRAWINGS

For a better understanding of the present invention, reference may be made to the following accompanying drawings.

DETAILED DESCRIPTION OF THE INVENTION

Figure 1:
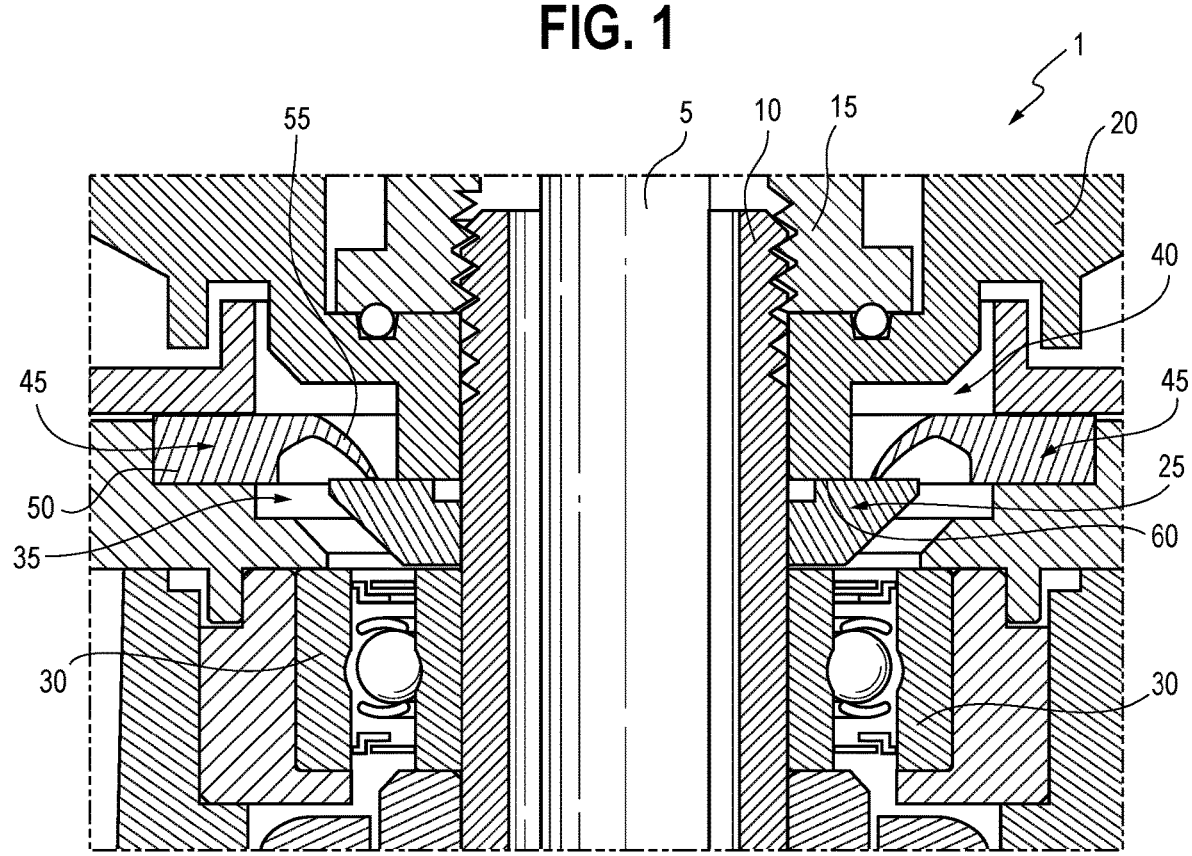
FIG. 1 is a cross-section view of a fishing reel having a pinion seal constructed according to the teachings hereof.

A spinning fishing reel 1 is illustrated in cross-section in FIG. 1. The reel 1 includes a main shaft 5 extending through the reel 1 surrounded by a pinion 10. A pinion nut 15 is selectively engageable with the pinion 10. A rotor 20 may be non-rotatably mounted to the pinion 10. A bushing 25 rotates about the shaft 5 with the pinion 10 when the reel 1 is in use.

A ball bearing assembly 30 is also provided adjacent to the bushing 25 to facilitate its rotation. Because an opening 35 may be formed between the rotor 20 and the ball bearing 30, a cover 40 may be provided to help prevent water from entering the ball bearing member 30 via the opening 35.

To keep the cover 40 in place and to further prevent water from entering the ball bearing assembly 30, a seal member 45 is provided that includes a main body portion 50 and a lip portion 55 protruding radially inward. The main body portion 50 of the seal member 45 may be assembled into the reel 1 such that it is held in place by a contact surface 60 of the bushing 25 and the cover 40. The seal member 45 is preferably made of a flexible material such as silicone or rubber. The lip portion 55 of the seal member 45 preferably engages the contact surface 60 in an axial direction, e.g., in the direction that the shaft 5 extends. By engaging the contact surface 60 axially, the seal is more easily controllable by simply adjusting the relative axial positions of the seal member 45 and contact surface 60 and is not reliant on the concentricity of parts within the reel 1, like prior art seal members.

Figure 2:
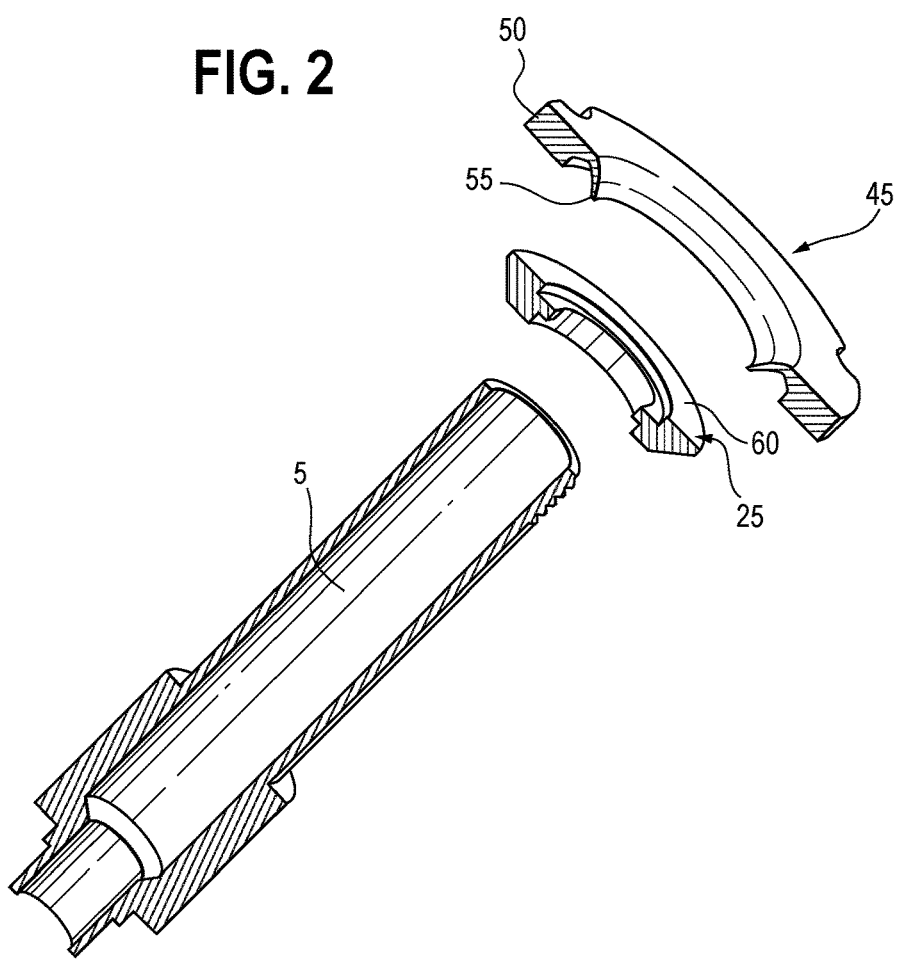
FIG. 2 is an exploded view of a seal member, main shaft, and bushing of the fishing reel of FIG. 1.
Figure 3:
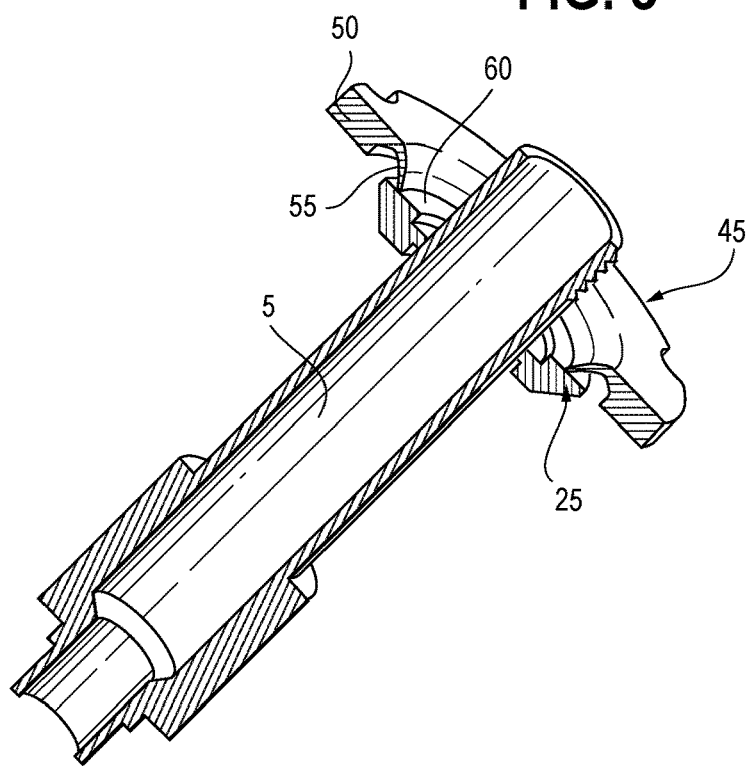
FIG. 3 is a cross-section view of the seal member, main shaft, and bushing of FIG. 2 engaged with one another.

The main shaft 5, bushing 25, and the seal member 45 are illustrated without the other described components of the reel 1 in FIGS. 2 and 3. In FIG. 2, the main shaft 5, bushing 25, and the seal member 45 are exploded from one another; in FIG. 3, they are engaged with one another.

Figure 4:
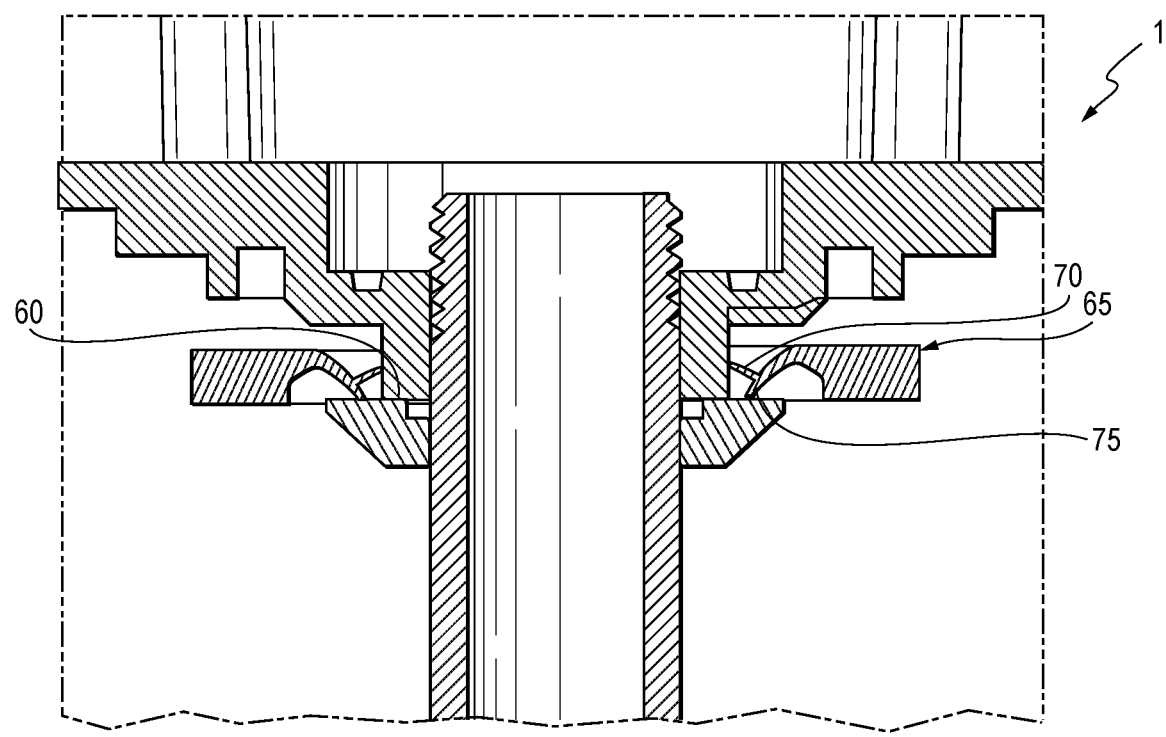
FIG. 4 is a cross-section view of an alternatively constructed seal member.
Figure 5:
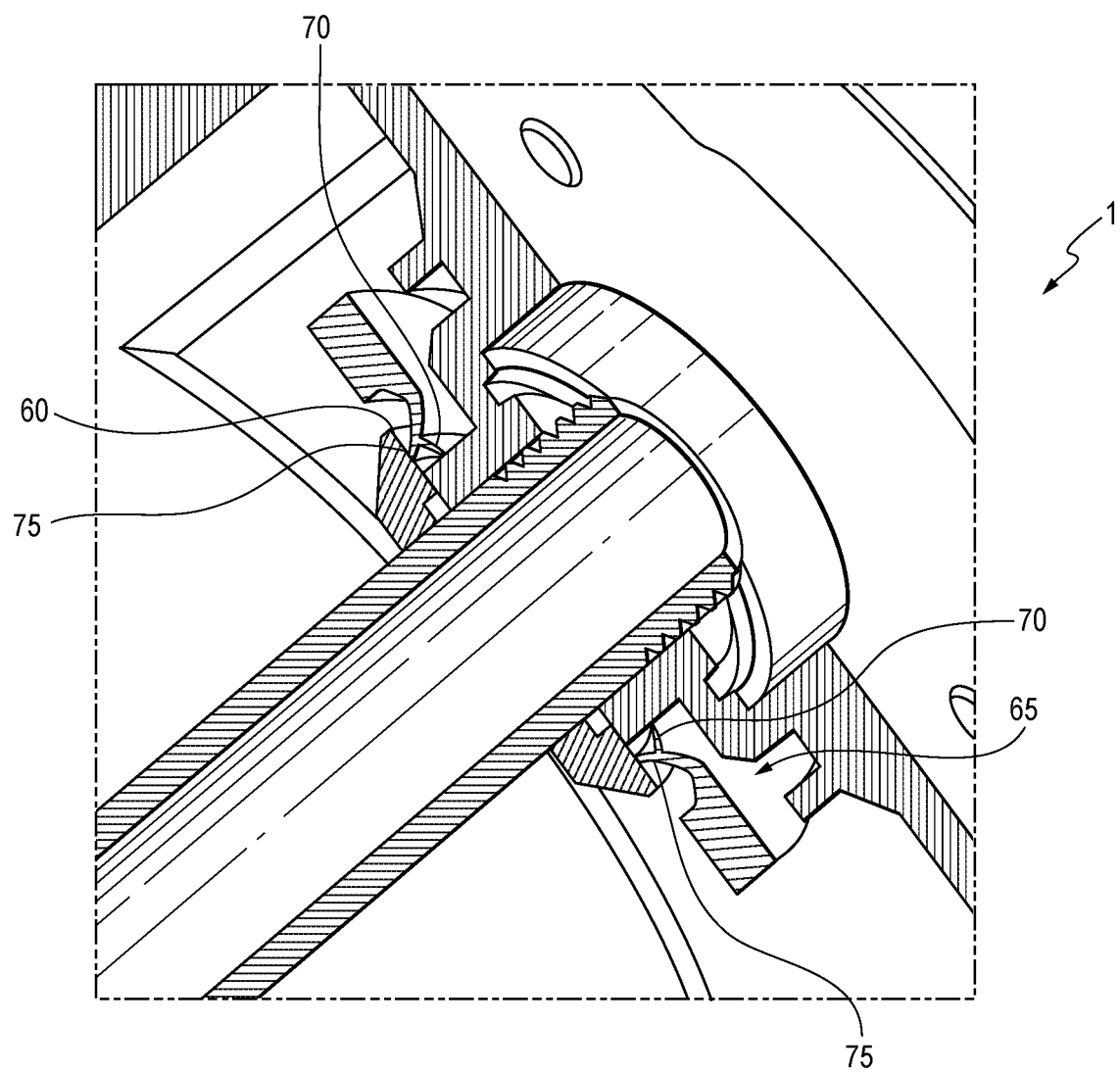
FIG. 5 is a second cross-section view of the alternatively constructed seal member of FIG. 4.

In an alternative embodiment illustrated in FIGS. 4 and 5, a seal member 65 is provided that includes additional contacts between the reel 1 and the seal member 65. For example, an arm portion 70 may be formed from the seal member 65 that extends upwardly and inwardly to contact the rotor 20. The engagement between the arm portion 70 and the rotor 20 may give some radial sealing qualities to the seal member 65 in addition to the axial sealing. More particularly, in the embodiment illustrated in FIGS. 4 and 5, a lip portion 75 having a structure similar to the lip portion 55 is provided that engages the contact surface in the axial direction. Thus, the seal member 65 has both axial and radial sealing qualities. Other structures are also envisioned that improve the sealing capabilities of the seal member 45.

In yet other embodiments, a spring (not illustrated) is biased against the seal member 45 to provide an axial force between the seal member 45 or the seal member 65 and the contact surface 60.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles, and scope of the present invention.

Many changes, modifications, variations, and other uses and applications of the present invention will, however, become apparent to those skilled in the art after considering the specification and the accompanying drawings. All such changes, modifications, variations, and other uses and applications which do not depart from the spirit and scope of the invention are deemed to be covered by the invention, which is limited only by the claims which follow.

The invention claimed is:

1. A seal member for use in a spinning fishing reel having a pinion, the seal member comprising:

a main body portion secured in place within the fishing reel; and a first lip portion extending inwardly from the main body portion in a radial direction relative to the pinion and making contact with at least one component of the fishing reel in an axial direction relative to the pinion.

2. The seal member of claim 1, wherein the seal member includes a second lip portion extending inwardly and making contact with at least one other component of the fishing reel in a radial direction relative to the pinion.

3. The seal member of claim 2, wherein the at least one other component of the fishing reel is a rotor, such that the second lip portion is in contact with the rotor.

4. The seal member of claim 1, wherein the at least one component of the fishing reel includes a bushing of the spinning fishing reel, such that the first lip portion is in contact with the bushing.

5. A spinning fishing reel, the spinning fishing reel including:
   a main shaft;
   a pinion surrounding the main shaft;
   a rotor non-rotatably mounted to the pinion;
   a bushing that rotates about the shaft with the pinion when the reel is in use;
   a ball bearing assembly adjacent to the bushing to facilitate rotation of the bushing; and
   a seal member positioned axially adjacent the bushing, the seal member including a main body portion and a first lip portion protruding inward from the main body portion in a radial direction relative to the pinion and contacting at least one component of the fishing reel in an axial direction relative to the pinion.

6. The spinning fishing reel of claim 5, wherein the spinning fishing reel further includes:
   an opening formed between the rotor and the ball bearing assembly;
   a cover placed over the opening; and
   wherein the main body portion of the seal member is assembled into the spinning fishing reel such that it is held in place by a contact surface of the bushing and the cover.

7. The spinning fishing reel of claim 5, wherein the seal member is made of at least one of silicone and rubber.

8. The spinning fishing reel of claim 5, wherein the seal member includes a second lip portion extending inwardly in a radial direction relative to the pinion.

9. The spinning fishing reel of claim 8, wherein the second lip portion is in contact with the rotor.

10. The spinning fishing reel of claim 8, wherein the second lip portion applies a radial force to the rotor.

11. The spinning fishing reel of claim 5, wherein the first lip portion is in contact with the bushing.

12. The spinning fishing reel of claim 5, wherein the seal member applies an axial force to the bushing.

13. A spinning fishing reel, the spinning fishing reel including:
    a main shaft;
    a pinion surrounding the main shaft;
    a rotor non-rotatably mounted to the pinion;
    a bushing that rotates about the shaft with the pinion when the reel is in use; and
    a seal member positioned above the bushing, the seal member including a main body portion and a lip portion protruding inward from the main body portion in a radial direction relative to the pinion and contacting at least one component of the fishing reel in an axial direction relative to the pinion.

14. The spinning fishing reel of claim 13, wherein the main body portion of the seal member is assembled into the spinning fishing reel such that it is held in place by a contact surface of the bushing.

15. The spinning fishing reel of claim 13, wherein the seal member is made of at least one of silicone and rubber.

16. The spinning fishing reel of claim 13, wherein the seal member includes an arm member extending inwardly in a radial direction relative to the pinion.

17. The spinning fishing reel of claim 16, wherein the arm member is in contact with the rotor.

18. The spinning fishing reel of claim 16, wherein the arm member applies a radial force to the rotor.

19. The spinning fishing reel of claim 13, wherein the lip portion is in contact with the bushing.

20. The spinning fishing reel of claim 13, wherein the seal member applies an axial force to the bushing.

* * * * *